United States Patent [19]

Sutton

[11] Patent Number: 4,704,925

[45] Date of Patent: Nov. 10, 1987

[54] PNEUMATIC CABLE STRIPPER

[75] Inventor: Donald C. Sutton, Sunnyvale, Calif.

[73] Assignee: The United States of America as represented by the Secretary of the Navy, Washington, D.C.

[21] Appl. No.: 885,479

[22] Filed: Jun. 27, 1986

[51] Int. Cl.$^4$ .............................................. H02G 1/12
[52] U.S. Cl. ........................................ 81/9.4; 24/523; 24/526
[58] Field of Search ........................ 81/9.4, 9.41, 9.42, 81/9.43, 9.51, 9.44; 24/136 R, 523, 526, 529

[56] References Cited

U.S. PATENT DOCUMENTS 2,179,007 11/1939 Brownlee ........................... 24/136 R
3,154,980 11/1964 Hayden et al. ...................... 81/9.51
4,509,257 4/1985 Moriyama ............................ 81/9.42

FOREIGN PATENT DOCUMENTS 13230 of 1915 United Kingdom ............. 24/136 R

Primary Examiner—Roscoe V. Parker
Attorney, Agent, or Firm—R. F. Beers; C. D. B. Curry; W. C. Daubenspeck

[57] ABSTRACT

Apparatus for stripping insulation from electrical cables which has two opposing clamp assemblies, a front assembly which is fixed to a housing box and a movable rear clamp assembly which slides on guide rods. The rear clamp assembly is biased against the front clamp assembly to maintain both clamp assemblies in the open position. A cable in which the insulation is scored is inserted into the opposing clamp assemblies with the scored section being disposed between the two clamp assemblies. A pneumatic motor operates through a pulley and rope system to pull the rear movable clamp assembly away from the front clamp assembly allowing the clamps to close on the wire to be stripped. The insulation is stripped as the rear clamp assembly is pulled away from the front pulley while the wire is held by the front pulley assembly.

11 Claims, 6 Drawing Figures

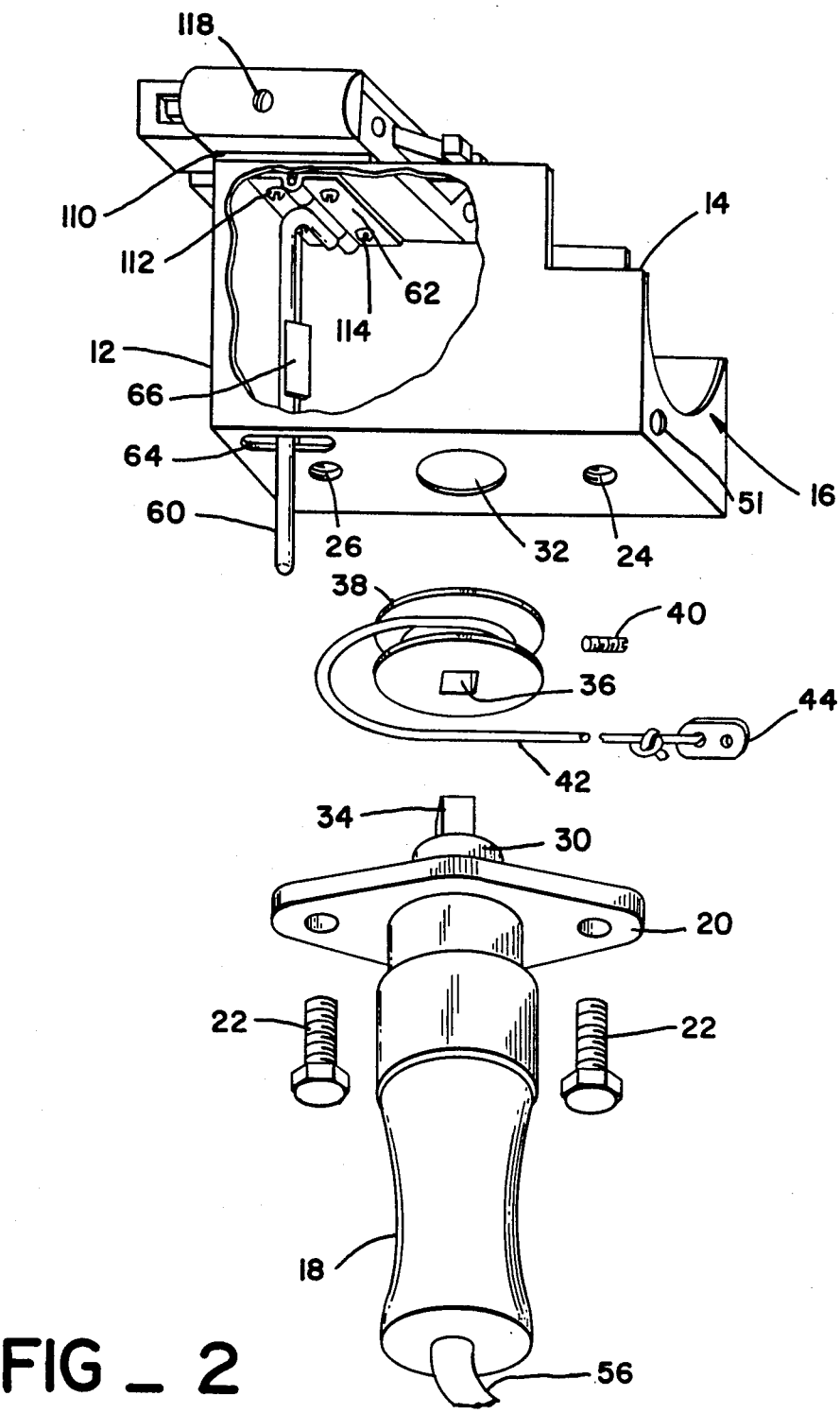
FIG _ 2

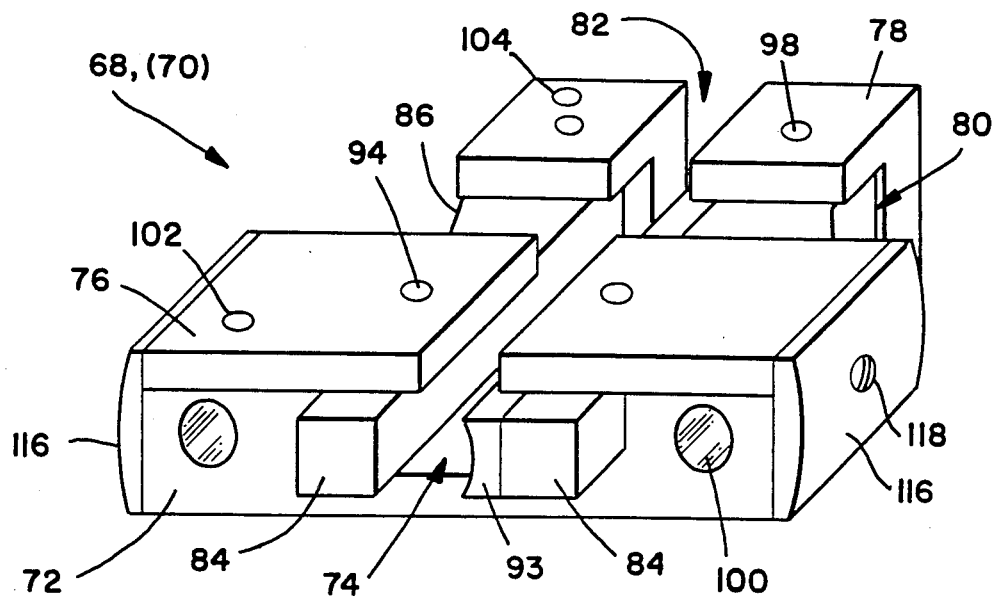
FIG_3
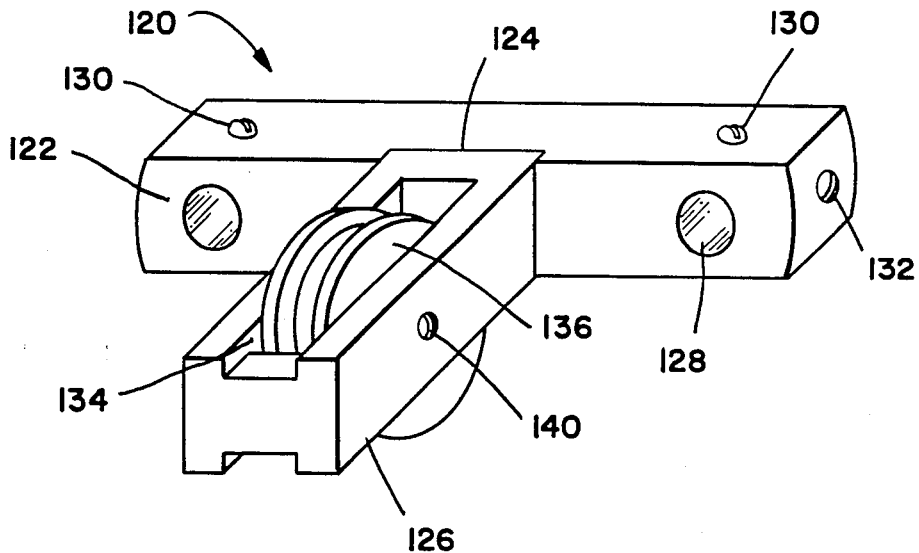
FIG_5

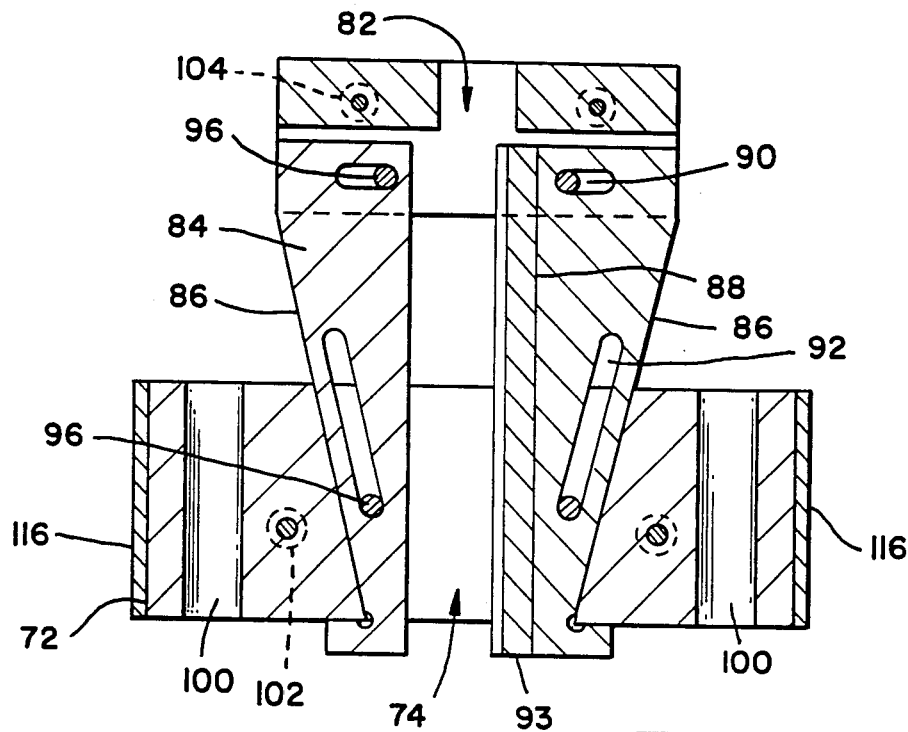
FIG_4a
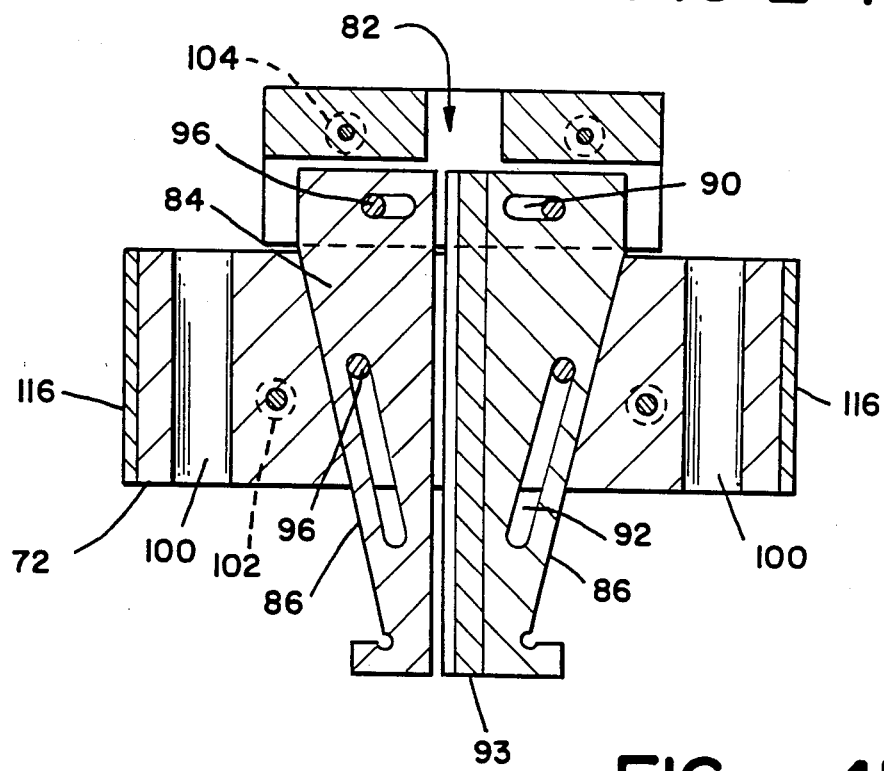
FIG_4b

PNEUMATIC CABLE STRIPPER

BACKGROUND OF THE INVENTION

This invention relates in general to apparatus for stripping insulation from cables and, in particular, to a small, light-weight, hand-held, pneumatically powered apparatus for stripping insulation from electrical cables. This invention is especially related to such apparatus for removing strip-wrapped heat-sealed insulation from electrical cables.

Kapton insulation is increasingly used in control signal cables in military and aerospace applications becuase it is hard, strong, and chemically and thermally resistant. Typically, the Kapton insulation is double-twist-wrapped and heat sealed. In cable manufacture, this insulation must be removed from the cable ends. The force required to strip the insulation can be well over twenty pounds on a five-inch production sample.

Currently, the following procedure is used to strip the cable. Because the Kapton is notch-sensitive, the cable insulation is first scored around the circumference. The cable is then flexed by hand to break the insulation at the score lines. The stripping is then completed by pulling the segment to be removed from the end of the cable by hand stripping or by a heavy, bulky, pneumatic clamp tool. The clamp tool is practical for stripping one end of the cable before it has been incorporated into a cable assembly. However the apparatus is too cumbersome to use at assembly tables. Hand stripping uses rubber pads or tubes to facilitate manual gripping of the cable. Although this method is usually fast and inexpensive, some cable insulation is wrapped too tightly to be removed by hand. In addition, the repeated gripping and pulling may cause muscular strain and tendonitis in the personnel performing the operation.

SUMMARY OF THE INVENTION

It is therefore a primary object of the present invention to provide a small, light-weight, hand-held, power tool for stripping Kapton insulation from control cables.

This object and other objects are provided by a pneumatically driven tool having two opposing clamp assemblies, a front assembly which is fixed to a housing box and a movable rear clamp assembly which slides on guide rods. The rear clamp assembly is biased against the front clamp assembly to maintain both clamp assemblies in the open position. A cable in which the insulation is scored is inserted into the opposing clamp assemblies with the scored section being disposed between the two clamp assemblies. A pneumatic motor operates through a pulley and rope system to pull the rear movable clamp assembly away from the front clamp assembly allowing the clamps to close on the wire to be stripped. The insulation is stripped as the rear clamp assembly is pulled away from the front pulley while the wire is held by the front pulley assembly.

The advantages and features of the present invention will become apparent from the following description of the preferred embodiment when considered in conjunction with the accompanying drawings wherein:

BRIEF DESCRIPTION OF THE DRAWINGS

FIG. 2 is a partial exploded view of the embodiment of FIG. 1;

FIG. 3 is a pictorial view illustrating the wire stripper clamp assembly of the preferred embodiment;

FIGS. 4a and 4b are cross-sectional views illustrating the wire stripper clamp assembly in open and closed position, respectively; and FIG. 5 is a pictorial view illustrating the rear pulley block assembly of the preferred embodiment.

DESCRIPTION OF THE PREFERRED EMBODIMENT

Figure 1:
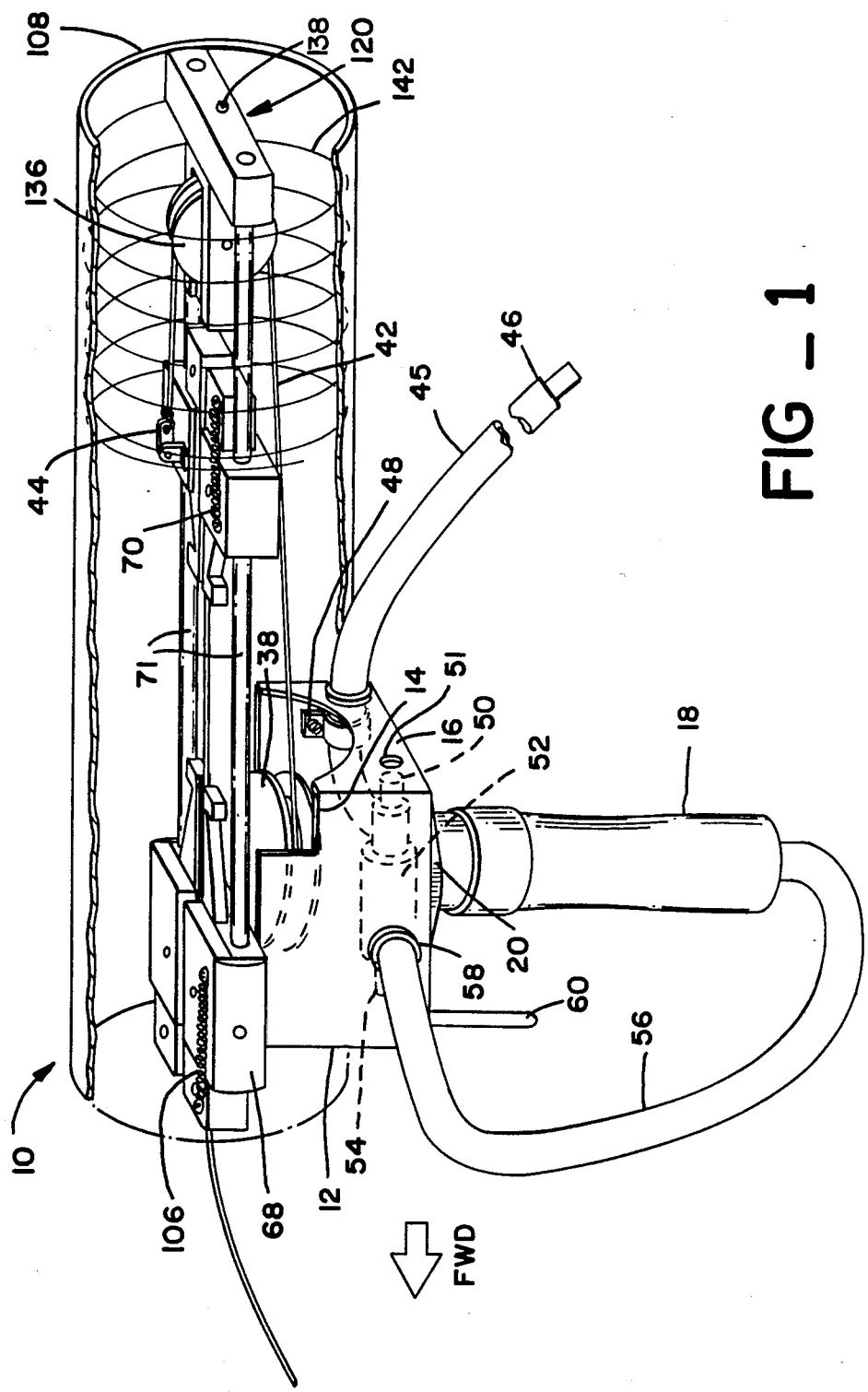
FIG. 1 is a pictorial view illustrating a preferred embodiment of a cable stripper according to the present invention.

Referring now to the drawings and, in particular to FIGS. 1 and 2, the preferred embodiment of the pneumatic cable stripper 10 includes a steel spindle housing box 12 having a shoulder section 14 at an open end 16. A pneumatic motor 18 having a mounting plate 20 is fixed to the bottom of the housing box 12. The mounting plate 20 is secured to the housing box 12 by bolts 22 (which extend through openings 24 and 26 in the housing box) and self-locking nuts (not shown). The rotary drive shaft 30 of the pneumatic motor 18 extends through an opening 32 in the base of the housing box 12. The drive shaft 30 has a square drive head 34 which is secured in a square channel 36 in a spool 38 by a set screw 40. A braided nylon rope 42 having an end connector 44 is secured to the spool 38. The rope 42 is wound around the spool's axis in the direction which allows the operation of the pneumatic motor 18 to take up the rope.

An air hose 45 having an air plug 46 for coupling to a source of pressurized air is secured to the side of the housing box 12 by a hose clamp 48. Within the housing box 12, the air hose 45 is coupled to a needle valve 50 which acts as a throttle control. An opening 51 in the housing box 12 allows access to adjust the needle valve 50. The needle valve 50 is coupled to a control valve 52 having an actuator 54 which acts to open the control valve when the actuator is depressed. The control valve 52 is positioned by means of a hose barb 58 at the penetration of the side of the housing box 12 and bonded by rigid adhesive to the side of the housing box to maintain the air supply apparatus in place. The control valve 52 is connected through hose barb 58 to a second air hose 56 which supplies pressurized air to drive the pneumatic motor 18. The second air hose 56 connects to the base of the pneumatic motor.

A T-shaped trigger 60 is secured to the inside surface of the top of the housing box 12 by trigger clamp 62. The barrel of the trigger extends out of the housing box through an elongated opening 64 in the bottom of the housing box. The trigger clamp 62 secures the crossbar of the T-shaped trigger 60 and allows the trigger to be rotated about the axis formed by the crossbar. An actuating plate 66 attached to the barrel contacts and depresses the actuator 54 of the control valve 52 when the trigger barrel is pulled, opening the control valve to connect the pressurized air to the motor 18.

The cable stripper 10 has two wire clamps—a fixed front clamp assembly 68 mounted on the top of the housing box 12 at the forward end of the device and a movable clamp assembly 70 which slides on guide rods 71. The structures of the fixed clamp 68 assembly and the moveable clamp assembly 70 are basically the same with only minor differences caused by the specific functions.

As best shown in FIGS. 3 and 4, the basic clamp assembly, illustrated in the open position, includes a guide block body 72 having a tapered channel 74. A pair of top plates 76 are fixed (welded) to the guide block body 72 to partially enclose the channel 74. The clamp assembly further includes a jaw guide 78 having a central horizontal channel 80 and a central vertical channel 82. A pair of clamp jaws 84 extend from the central horizontal channel 80 of the jaw guide 78 through the tapered channel 74 of the guide block body 72. As best shown in FIG. 4, the clamp jaws 84 have a tapered side 86 corresponding to the taper of tapered channel 74 and a straight side 88. The clamp jaws 84 also have a first slot 90 which is parallel to and disposed in the central horizontal channel 80 and a second slot 92 which is parallel to the tapered side 86 and disposed in the tapered channel 74. A rubber pad 93 having a curved inward facing surface adapted to grasp the wire to be stripped is cemented to the straight side 88 of each clamp jaw 84. For clarity, only one pad 93, the pad on the right in FIGS. 3 and 4, is shown.

Each guide block top plate 76 has a vertical hole 94 through which pins 96 are inserted into the second slots 92 of the clamp jaws 84. Similarly, the jaw guide 78 has two vertical holes 98 through which pins 96 are inserted into the first slots in the clamp jaws 84. The guide block body 72 also has a pair of horizontal cylindrical passages 100 for receiving the guide rods 71.

A tapped hole 102 is provided in the guide block body 72 in top plate 76. A second tapped hole 104 is provided in the jaw guide 78. An extension spring 106 (See FIG. 1), which is secured between hole 102 and hole 104 by screws, provides a force tending to pull the guide block body 72 and the jaw guide 78 together. Thus the clamp assemblies are spring-loaded in the closed position (i.e., the clamp jaws are biased to their most nearly closed position).

The cable stripper 10 has a safety tube 108 of transparent plastic which allows the operator to observe the operation while protecting the operator from accidental contact with the moving parts.

Turning now to the fixed front clamp 68 assembly, the front clamp assembly is mounted, over spacer 110, on the top surface of the housing box 12 with the clamp jaws facing toward the rear as shown in FIG. 1. The guide block body 72 is secured to the top surface of the housing box 12 by bolts 112 which pass from box 12 vertically upward to engage tapped holes in guide box 72. the bolts 112, along with screws 114, also secure the trigger clamp 62 to the top inside surface of the housing box 12. The sides of the front clamp assembly 68 have curved spacers 116 for providing a surface to abut the safety tube 108. The safety tube 108 is attached at each side to the front clamp assembly by screws 118 which thread into tapped holes in the spacers 116 and the guide block body 72. The screws 118 also serve to secure the guide rods 71 in the cylindrical passages 100. The spacers 116 are welded to the clamp body 72 prior to machinining of holes for screws 118.

Turning now to the movable clamp assembly 70, the movable clamp assembly is supported by the two guide rods 71 which pass through the cylindrical passages 100. The movable clamp assembly 70 is disposed with clamp jaws 84 facing the fixed clamp assembly 68 and is free to slide on the two guide rods. The end connector 44 of the takeup rope 42 is fixed to the movable clamp assembly 68 by screw 107.

The guide rods 71 are coupled to a rear block pulley assembly 120 which is best shown in FIGS. 1 and 5. The rear block pulley assembly 120 includes a rear block 122 having a central notch 124 for receiving the end of a pulley mounting block 126 and passages 128 for receiving the guide rods 71. Screws 130 secure the guide rods 71 while screws 132 support the aft end of safety tube 108.

The pulley mounting block 126 has a central cavity 134 in which a pulley 136 is disposed. The pulley mounting block 126 is secured to the rear block 122 by a screw 138 (See FIG. 1) passing through aligned apertures (not shown) in block 126 and block 122. The pulley 136 is mounted on an axis 140 passing through apertures in the side walls of the pulley mounting block 126. The takeup rope 42 extends from the spool 38 to wrap around the pulley 136 and be attached by the connector 44 to the guide block body 72 of the movable clamp assembly 70.

A main spring 142 is disposed between the movable clamp assembly 70 and the rear block 122 within the safety tube 108. The main spring 142, which is a compression spring, surrounds the apparatus outside the guide rods 71 and has one end attached to the rear surface of the movable clamp assembly 70 and the other end attached to the front surface of the rear block 122.

The cable stripper 10 operates as follows. The fixed clamp assembly 68 and the movable clamp assembly 70 of the cable stripper 10 are maintained prior to actuation in the open position by the action of the main spring 142. The main spring 142 pushes the movable clamp assembly 70 forward against the front clamp assembly 68 so that the clamp jaws of the two assemblies abut. The spring force of the main spring 142 overcomes the biasing force of the extension springs 106, which tends to close the clamp assemblies 68 and 70, to maintain the clamps in the open position.

With the movable clamp assembly pushed against the front clamp assembly so that the clamps are open, the cable 144, which has been scored and flexed to break the insulation at the score lines, is inserted into the open clamp assemblies 68 and 70 with the point of scoring extending beyond the front clamp assembly 68. Access to the clamp assemblies 68 and 70 is through the partially open front end of the safety tube 108. The safety tube 108 allows observation of the operation while affording a degree of operator protection. The air motor 18 is then actuated by pulling the trigger 60 which presses the actuating plate 66 against the actuator 54 to open the control valve 52, supplying pressurized air to the air motor.

The actuated air motor 18 rotates the spool 38 to take up the nylon rope 42 which is attached to the guide block 72 of the movable clamp assembly 70 after passing over the pulley 136. The rope takeup, operating against and compressing the main spring 142, pulls the rear movable clamp assembly 70 away from the front fixed clamp assembly 68, allowing the clamp jaws of both of the front and rear clamps to close under the biasing of the extension springs 106 and to grip the cable 144. Further movement of the movable clamp assembly 70 away from the fixed clamp assembly 68 pulls on the cable, stripping the insulation from the cable end.

The movement of the movable clamp assembly 70 is blocked at the end of travel by the pulley mounting block 126 of the rear block pulley assembly 120. Release of the trigger 66 closes the control valve 52, thereby removing air pressure from the air motor 18. The mainspring 142 then expands to return the movable clamp assembly 70 to its forward open position. This automatic return allows one-handed operation so that one hand may be free to manipulate the cable.

Obviously many modifications and variations of the present invention are possible in light of the foregoing teachings. It is therefore to be understood that within the scope of the appended claims the invention may be practiced otherwise than as specifically described.

What is claimed and desired to be secured by Letters Patent of the United States is:

1. Apparatus for stripping insulation from electrical cables comprising:
   (a) a housing box, said housing box having a partially open end at the rear;
   (b) a rotary drive means;
   (c) a spool coupled to said rotary drive means, said spool being disposed in said housing box and being driven by said rotary drive means;
   (d) a takeup rope having one end coupled to said spool for takeup upon actuation of said rotary drive means;
   (e) means for actuating said rotary drive means;
   (f) a fixed front clamp assembly mounted on said housing box, said front clamp assembly including a guide block having a tapered channel, a pair of clamp jaws movably disposed in said tapered channel and a jaw guide for maintaining the jaws in the tapered channel, said guide block being fixed to said housing box, the inside surface of said clamp jaws being adapted for grasping said wire when said clamp jaws are forced together, the outside surface of said clamp jaws being tapered so that rearward movement of said clamp jaws in said tapered channel will force said jaws together toward a closed position, said front clamp assembly being mounted on said housing with said tapered channel directed toward the rear of the housing box;
   (g) first means for biasing the clamp jaws of said front clamp assembly in the closed position;
   (h) a movable rear clamp assembly including a guide block having a tapered channel, a pair of clamp jaws movably disposed in said tapered channel and a jaw guide for maintaining the jaws in said tapered channel, the inside surface of said clamp jaws being adapted for grasping said wire when said clamp jaws are forced together, the outside surface of said clamp jaws being tapered so that forward movement of said clamp jaws in said tapered channel will force said jaws together toward a closed position, said rear clamp assembly being disposed so that said tapered channel is directed toward the front of the housing box;
   (i) second means for biasing the clamp jaws of said rear clamp assembly in the closed position;
   (j) a rear block pulley assembly disposed to the rear of said rear movable clamp assembly, said rear block pulley assembly including a pulley and means for mounting said pulley, the takeup rope being fed from said spool over said pulley and coupled to the guide block of said rear clamp assembly;
   (k) means for supporting said rear clamp assembly and said rear block pulley assembly; and
   (l) third means for biasing the rear movable clamp assembly against said front clamp assembly so that the clamp jaws of the front clamp assembly and the clamp jaws of the rear clamp assembly abut, said third means for biasing overcoming said first and second means for biasing so that said clamp jaws of said front and rear clamp assemblies are forced into an open position.

2. Apparatus as recited in claim 1 wherein said first means for biasing said clamp jaws of said front clamp assembly comprises an extension spring coupled between the guide block of the front clamp assembly and the jaw guide of the front clamp assembly and wherein said second means for biasing said clamp jaws of said rear clamp assembly comprises an extension spring coupled between the guide block of the rear clamp assembly and the jaw guide of the rear clamp assembly.

3. Apparatus as recited in claim 2 wherein said means for supporting said rear clamp assembly and said rear block pulley assembly includes a pair of guide rods.

4. Apparatus as recited in claim 3 wherein said guide rods have a first end disposed in apertures in said guide block of said front clamp assembly, pass through apertures in the guide block of said rear clamp assembly, and have a second end disposed in apertures in said rear block pulley assembly.

5. Apparatus as recited in claim 3 wherein said third means for biasing the rear movable clamp assembly includes a compression spring disposed between the rear movable clamp assembly and the rear block pulley assembly.

6. Apparatus as recited in claim 5 wherein said rotary drive means comprises a pneumatic motor coupled to a source of pressurized air.

7. Apparatus as recited in claim 6 wherein said means for actuating said rotary drive means comprises:
   (a) a control valve coupled between the source of pressurized air and the pneumatic motor; and
   (b) a trigger for actuating said control valve to open said control valve.

8. Apparatus as recited in claim 7 further comprising a needle valve coupled between said control valve and said source of pressurized air, said needle valve acting as a throttle control.

9. A clamp assembly for use in stripping insulation from electrical cables, which comprises:
   (a) a guide block having a forwardly tapered channel;
   (b) a pair of clamp jaws movable disposed in said tapered channel, the inside surface of each said clamp jaw being adapted for grasping a wire when said jaws are forced together, the outside surface of each said clamp jaw being tapered so that so that forward movement of said clamp jaws in said forwardly tapered channel will force the jaws together toward a closed position; and
   (c) means for maintaining said clamp jaws in the tapered channel of said guide block including,
   each said clamp jaw having a first slot parallel to the tapered outside surface of said jaw and a second slot normal to the inside surface of said jaw;
   a jaw guide disposed over the second slots of said clamp jaws, said jaw guide having a pair of holes, one hole disposed over each of the second slots;
   said guide block body having a pair of holes, one hole disposed over each of said first slots in said clamp jaws; and
   four pins, two of the pins disposed through the two holes in the jaw guide and extending through of the second slots, and two of the pins disposed through the holes in the guide block and extending through the first slots.

10. A clamp assembly as recited in claim 9 further including means for biasing said clamp jaws in the closed position.

11. A clamp assembly as recited in claim 10 wherein said means for biasing is an extension spring coupled between said guide block and said jaw guide for pulling said guide block and said jaw guide together.

* * * * *